H.C. Smith,
Harness,

Nº 56,283. Patented July 10, 1866.

Witnesses.
Frank Millward
James H. Layman

Inventor.
H. C. Smith
By Knight Bros
Attorneys

UNITED STATES PATENT OFFICE.

HECTOR CRAIG SMITH, OF DUBLIN, INDIANA.

IMPROVED HARNESS FOR HORSES.

Specification forming part of Letters Patent No. 56,283, dated July 10, 1866.

*To all whom it may concern:*

Be it known that I, HECTOR C. SMITH, of Dublin, Wayne county, Indiana, have invented a certain new and useful Hitching Device; and I do hereby declare the following to be a full, clear, and exact description thereof, reference being had to the accompanying drawings, making part of this specification.

My invention relates to a cheap, simple, and secure device for hitching horses to vehicles which are provided with shafts; and the object of my improvement is to dispense with the customary complicated trappings used for that purpose and to concentrate the hitching at a single point on each side of the animal, so that by simply buckling or otherwise engaging two straps the horse is attached to the vehicle and the unhitching is as readily effected.

Figure 1:
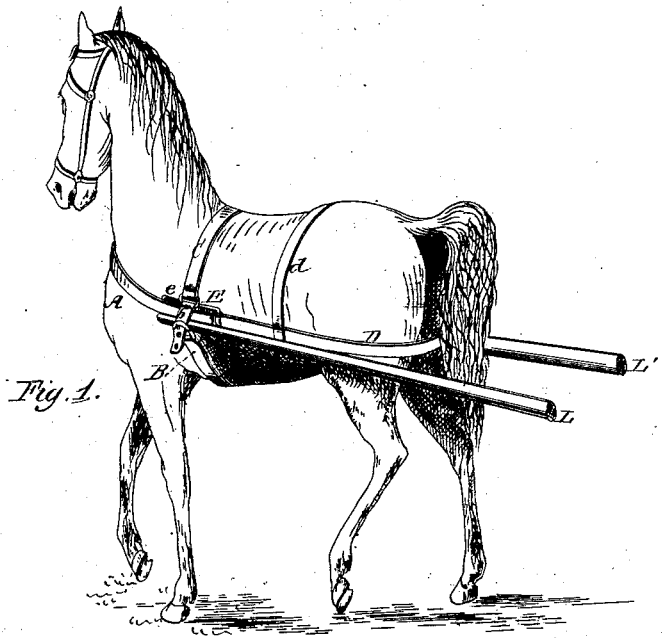
Figures 2, 3, 4:
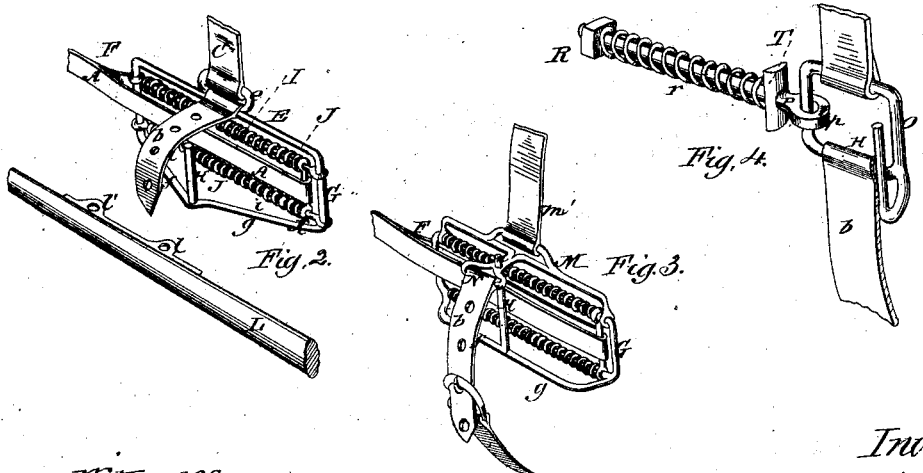

In the accompanying drawings, Figure 1 shows a horse attached to a pair of shafts by my improved hitching device; and Figs. 2, 3, and 4 represent modifications of my device on an enlarged scale.

The harness which I employ in connection with my hitching device may consist only of four pieces—to wit, the breast-strap A, girth B, saddle-strap C, and breeching D $d$.

The most approved form of my hitching device consists, as is shown in Fig. 2, of a link composed of an upper and horizontal bar, E, provided with two short vertical end pieces or rods, F G, and the lower part of these rods have outwardly-flaring portions $f$ $g$, which are forged together so as to constitute the hitching-pin H.

I and J are two rods, which are parallel to the bar E, and said rods are securely attached to the end pieces, F and G, and are surrounded with spiral springs $i$ and $j$, which bear against the end piece, F, and the yielding cross-head K.

The cross-head K is adapted to move freely along the rods I J without becoming detached from them, and the breast-strap A is attached to said cross-head.

The shafts L L' of the vehicle are provided with a number of staples, $l$ $l'$, either one of which is caused to engage over the hitching-pin H, as may be the most convenient.

The saddle-strap C is connected to the loop $e$ of the bar E, and the breeching D is attached to the end rod, G, so that the girth B is the only part of the harness which is required to be attached to or detached from the hitching device.

Whenever it is desired to hitch a horse to a wagon the harness is placed on the animal in the customary manner, and one of the staples $l$ is slipped over the hitching-pin H, and the girth B being buckled to the girth-strap $b$, the operation of hitching is completed in a few moments, it being understood that the hitching device is the same on both sides of the horse.

As the girth-strap $b$ is buckled down over the shaft L, the latter is held securely in its proper position, and there is no liability of the staple $l$ becoming disconnected from the hitching-pin H, and the provision of the springs $i$ $j$ relieves the horse from any sudden strain or jar occasioned by the vehicle coming in contact with an obstruction.

Fig. 3 shows a modification of my device, in which a link composed of the parts F $f$, G $g$, and H of Fig. 1 is suspended from and vibrates within a yoke, M, having a tongue, $m$, and the latter is perforated to receive the upper end of the hitching-pin H, and said tongue $m$ terminates in a loop, N, to which the girth-strap $b$ is attached, while the saddle-strap C is connected to the loop $m'$.

Fig. 4 exhibits a more simple modification of my invention, in which the hitching-pin H is attached to the rear part of a link, O, while a rod, P, provided with eye $p$, pinching-nut R, spring $r$, and cross-head T, is connected to the front part of said link, the breast-strap, saddle-strap, girth, and breeching being attached to the link the same as in Figs. 1 and 2, the girth-strap, however, being secured to the lower part of the link.

For buggies, pleasure-carriages, and other vehicles intended for light draft only, either of the three described forms may be used with perfect safety; but for drays, express-wagons, &c., the staples $l$ would be apt to pull out of the shafts, and I therefore employ a somewhat different arrangement for such purposes.

Instead of attaching the shafts to the hitching-pin H, they simply pass through loops on the under side of the girth-strap $b$, and the animal draws the wagon by means of small rods, which I substitute for the traces, said rods being attached to the customary single-tree, and their forward ends are provided with a short chain, whose links engage with the hitching-pin.

I claim herein as new and of my invention—

1. The hitching device consisting of a link composed of the following members, to wit: the horizontal bar E, vertical end rods, F G, and hitching-pin H, together with their accessories, or devices substantially equivalent, all arranged to operate in the manner and for the purpose herein described.

2. In combination with the elements of the preceding clause, the cross-head K and springs $i\,j$, or their mechanical equivalents, for the object explained and set forth.

In testimony of which invention I hereunto set my hand.

HECTOR C. SMITH.

Witnesses:
GEO. H. KNIGHT,
JAMES H. LAYMAN.